No. 896,396. PATENTED AUG. 18, 1908.
C. & E. J. KRUSE.
ATTACHMENT FOR BREAD KNEADING AND MOLDING MACHINES.
APPLICATION FILED JUNE 12, 1907.
2 SHEETS—SHEET 1.
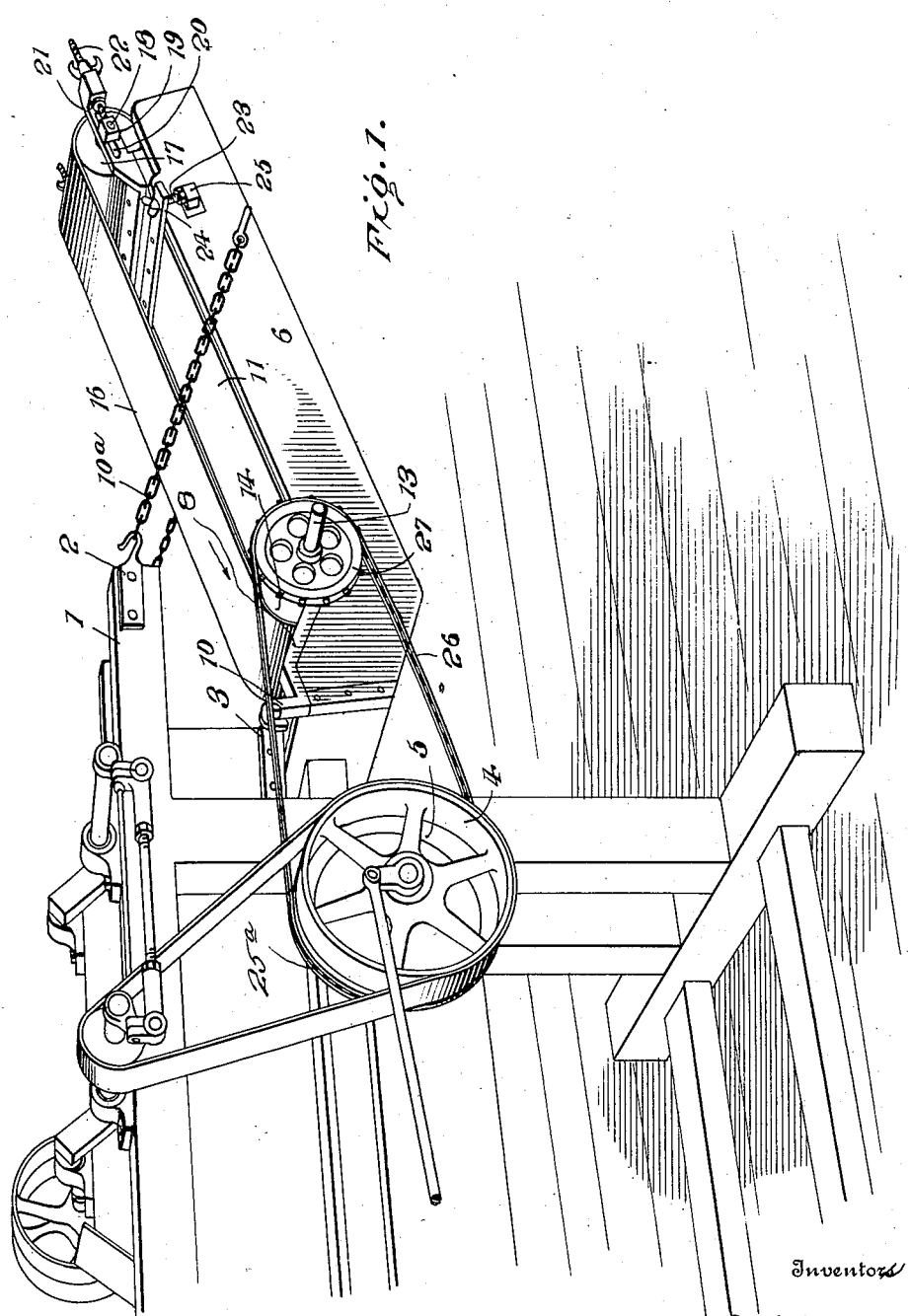

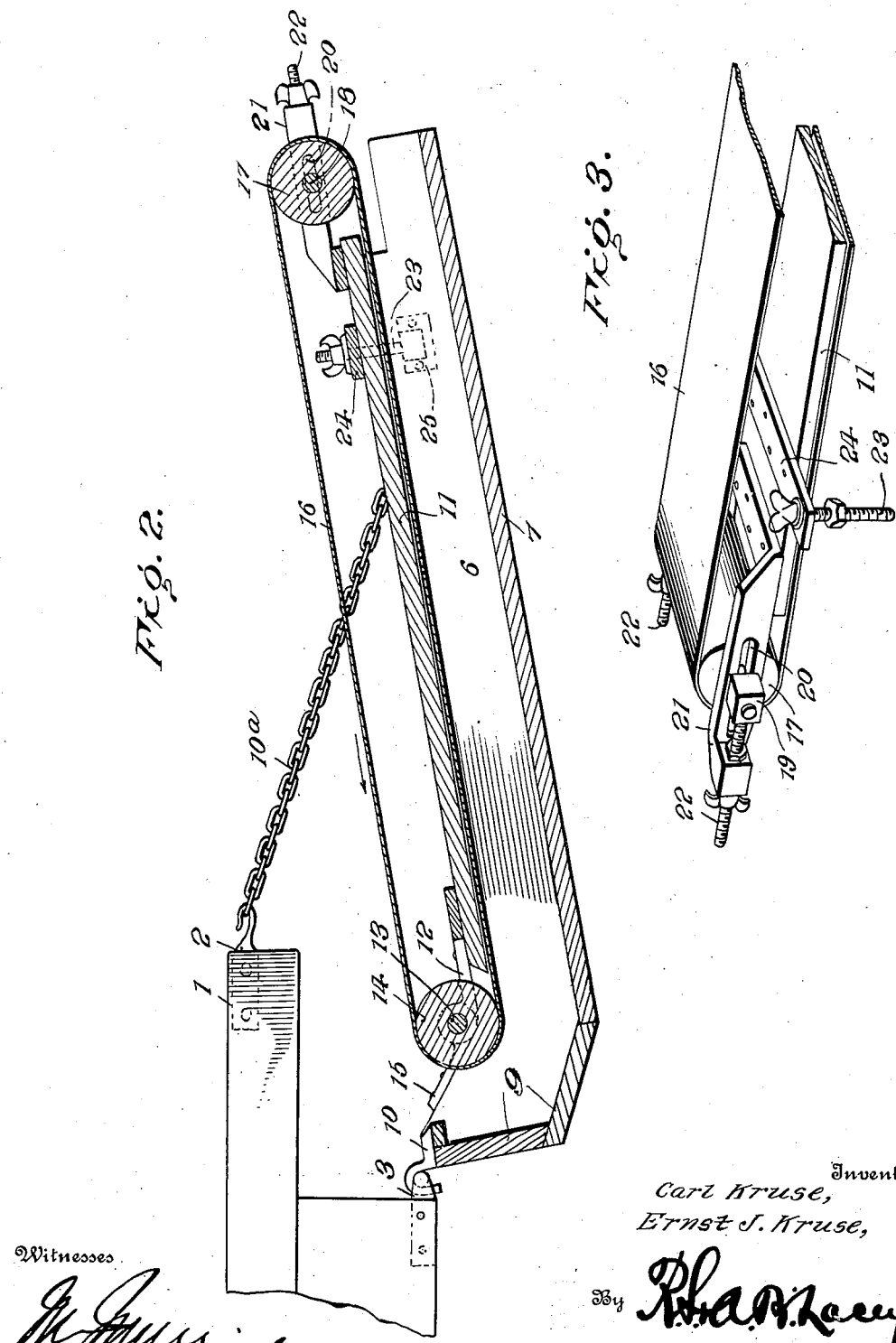

UNITED STATES PATENT OFFICE.

CARL KRUSE AND ERNST J. KRUSE, OF SEATTLE, WASHINGTON.

ATTACHMENT FOR BREAD KNEADING AND MOLDING MACHINES.

No. 896,396.  Specification of Letters Patent.  Patented Aug. 18, 1908.

Application filed June 12, 1907. Serial No. 378,671.

*To all whom it may concern:*

Be it known that we, CARL KRUSE and ERNST J. KRUSE, citizens of the United States, residing at Seattle, in the county of King and State of Washington, have invented certain new and useful Improvements in Attachments for Bread Kneading and Molding Machines, of which the following is a specification.

This invention comprehends certain new and useful improvements in molding attachments for bread kneading machines, the present embodiment of the invention being particularly designed for use in connection with a machine of the character disclosed in our Letters Patent of the United States, No. 841,408, dated January 15th, 1907, although it is to be understood that the invention is equally applicable to kneading machines of other types and constructions.

The invention has for its object a removable attachment for a bread kneading machine so arranged that it may be readily attached to and suspended from the end of the main machine, the invention providing means whereby one standard size kneading machine may be used with a number of attachments of this character of different sizes or widths, according to the length of loaf that it is desired to roll through the attachment and thus mold.

The invention consists in certain constructions, arrangements and combinations of the parts that we shall hereinafter fully describe and then point out the novel features in the appended claims.

For a full description of the invention and the merits thereof and also to acquire a knowledge of the details of construction of the means for effecting the result, reference is to be had to the following description and accompanying drawings, in which:

Figure 1 is a perspective view of the discharge end of a bread kneading and molding machine to which the improved attachment of our invention is secured in operative relation; Fig. 2 is a longitudinal sectional view of the attachment; and, Fig. 3 is a perspective view of a portion of the rolling blade or apron and its attachment mounted at one end.

Corresponding and like parts are referred to in the following description and indicated in all the views of the drawings by the same reference characters.

For the purpose of obtaining a complete disclosure of the present invention, we have illustrated a portion of a bread kneading machine, 1 designating the upper sills of the framework that are provided at their rear ends with divergent hooks 2, the said framework being provided below the hooks 2 and in advance of said hooks, as shown, with offset lugs 3.

4 designates one of the main wheels or pulleys of the machine, a sprocket wheel 5 in the present instance being mounted on the same shaft with said pulley.

Our improved bread molding attachment comprises an elongated casing, consisting of side bars 6 to which the base board 7 is secured in any desired manner. The said bars 6 at their front ends are provided with forwardly inclined upper edges 8, and an inclined feeding board 9 is secured to and between the said side bars parallel to the said edges. At their front ends, the side bars 6 of the casing are provided with downwardly facing hooks 10 that are adapted to take over the outwardly projecting lugs 3 of the kneading machine framework so as to swing the attachment on the rear end of the main machine. Chains 10ª or similar flexible connecting members are secured at one end to the casing and are adapted to be engaged with the hooks 2 of the framework, so as to hold the attachment at the proper inclination on the kneading machine at the rear or discharge end thereof.

The top board 11 of the casing is provided at its front edge with apertured ears 12 adapted to receive the spindle 13 of a roller 14, said spindle being mounted in bearings 15 secured to the inclined edges of the said bars 6. An endless belt or apron 16 passes around the roller 14 and also around a similar roller 17 at the rear end of the top board 11. This last named roller is mounted on a shaft 18 which is journaled in boxings 19 and which extends through slots 20 in longitudinally extending bearing plates 21 secured to the rear edge of the board 11.

22 designates adjusting screws that have bearing in the rear ends of the plates 21 and that engage or contact with the boxings 19 so as to adjust the tension of the apron or belt 16, as shown. The said apron travels with its lower lap in contact with the lower surface of the board 11.

Adjusting screws 23 work vertically through a transverse plate 24 secured to the upper face of the board 11, said adjusting screws working in sockets in brackets 25 projecting outwardly from the said bars 6 of the casing.

The apron may be driven in any way, and in the present instance we have shown for this purpose a sprocket wheel 25ª with a sprocket chain 26 extending over said wheel and over a similar, though preferably smaller sprocket wheel 27 on the spindle 13.

In the practical operation, the dough, as it is discharged from the kneading machine, will be fed down the sloping board 9 into the casing of the molding attachment and will be passed underneath the endless apron or belt 16 and rolled rearwardly into the casing between the lower lap of the belt, made substantially unyielding by the top board 11 and the bottom board, or base 7 of the casing. It will thus be molded into the desired length of loaves according to the distance apart of the side bars 6, and be discharged at the rear end of the molding attachment. By means of the screws 23, the top board 11 may be adjusted to different elevations relative to the base board 7.

From the foregoing description in connection with the accompanying drawings, it will be seen that we have provided a very simple, durable and efficient construction of bread molding attachment for kneading machines, whereby the kneading machine may be of any standard size, while the attachments may be of different sizes, according to the length or widths of loaf that it is desired to form.

Having thus described the invention, what is claimed as new is:

1. The combination with a bread kneading machine provided at its discharge end with a pair of outstanding hooks and with a pair of lugs below the hooks, of a molding attachment comprising a casing provided at one end with hooks adapted to engage the said lugs, flexible connecting members attached to said casing and engaging said hooks whereby to detachably connect the casing to the rear end of the kneading machine, the casing of said attachment including a base board and a top board spaced therefrom, rollers mounted in the casing, an endless apron extending around said rollers with its lower lap passing underneath the top board, and means for actuating said apron.

2. The combination with a bread kneading machine, of a molding attachment in alinement with the rear end thereof, a pivotal connection between the adjacent ends of the machine and attachment, connecting members secured to the attachment in the rear of such pivotal connection and arranged for adjustable connection with the machine whereby to support the attachment from the machine at different inclinations, said attachment comprising a casing and an apron mounted to travel in said casing, and means for driving said apron.

3. The combination with a bread kneading machine, of a molding attachment in alinement with the rear end of the machine, the adjacent ends of the machine and attachment being secured to each other with the end of the attachment in suspended relation, and suspension members connected to the machine and to the attachment in the rear of the first named connection.

4. The combination with a bread kneading machine provided at its discharge end with a pair of outstanding hooks and with a pair of lugs below the hooks, of a molding attachment comprising a casing provided at one end with hooks adapted to engage said lugs, chains attached to said casing at the sides thereof and designed to engage the hooks, whereby to detachably connect the casing at the rear end of the kneading machine at different inclined positions, an endless apron mounted to travel in said casing, and means for driving said apron.

In testimony whereof we affix our signatures in presence of two witnesses.

CARL KRUSE. [L. S.]
ERNST J. KRUSE. [L. S.]

Witnesses:
F. W. CLAUS,
P. DENNINGER.